United States Patent [19]

Lando

[11] 3,808,028

[45] Apr. 30, 1974

[54] METHOD OF IMPROVING ADHESIVE PROPERTIES OF A SURFACE COMPRISING A CURED EPOXY

[75] Inventor: David Jacob Lando, Lawrence Township, Mercer County, N.J.

[73] Assignee: Western Electric Company, Incorporated, New York, N.Y.

[22] Filed: May 30, 1972

[21] Appl. No.: 258,116

Related U.S. Application Data

[63] Continuation-in-part of Ser. No. 170,768, Aug. 11, 1971, abandoned.

[52] U.S. Cl. ........ 117/47 A, 117/130 E, 117/160 R, 117/213, 156/2

[51] Int. Cl. .......... B44d 1/092

[58] Field of Search ............ 117/47 A, 160 R, 47 H, 117/138.8 R, 212, 213; 156/2

[56] References Cited

UNITED STATES PATENTS

| | | | |
|---|---|---|---|
| 3,758,332 | 9/1973 | Dinella et al. | 117/160 R |
| 3,650,859 | 3/1972 | D'Ottavio | 156/2 |
| 3,698,940 | 10/1972 | Mersereau et al. | 117/213 |
| 3,562,005 | 2/1971 | DeAngelo et al. | 117/212 |
| 3,573,973 | 4/1971 | Drotar et al. | 117/212 |
| 3,445,264 | 5/1968 | Haines | 117/47 A |

*Primary Examiner*—Douglas J. Drummond
*Assistant Examiner*—Michael W. Ball
*Attorney, Agent, or Firm*—J. Rosenstock

[57] ABSTRACT

A method of improving adhesive properties of a surface, comprising a cured epoxy product resulting from curing an epoxy composition, comprising from 0 to 20 weight percent of an uncured epoxylated novolac resin and a remainder of an uncured bisphenol A-epichlorohydrin epoxy resin, is disclosed. The method comprises exposing the cured epoxy surface to a suitable swellant to swell the surface. Some typical suitable swellants include dimethylformamide, 1-methyl-2-pyrrolidinone, a mixture comprising 1-methyl-2-pyrrolidinone and an organic component selected from the group comprising (a) ethylene glycol, (b) 4-hydroxy-4-methyl-2-pentanone, and (c) formic acid and a mixture comprising dimethylformamide and an organic component selected from the group comprising (a) ethylene glycol, (b) 4-hydroxy-4-methyl-2-pentanone, (c) formic acid, (d) 1,1,1 trichloroethane, (3) a mixture of methyl ethyl ketone and 1,1,2 trichloro-1,2,2 trifluoroethane, and (f) a mixture of acetone and 1,1,2-trichloro-1,2,2 trifluoroethane. The swelled surface is then exposed to a suitable acidic etching solution, comprising $Cr^{+6}$ ions therein, to etch the surface.

35 Claims, 3 Drawing Figures

METHOD OF IMPROVING ADHESIVE PROPERTIES OF A SURFACE COMPRISING A CURED EPOXY

This application is a continuation-in-part of my copending application Ser. No. 170,768, filed Aug. 11, 1971, now abandoned.

BACKGROUND OF THE INVENTION

1. Field of the Invention

This invention relates to a method of improving adhesive properties of a surface comprising a cured epoxy and more particularly, to improving adherence of a selected species to a surface of a cured epoxy resulting from curing an uncured epoxy composition comprising an uncured epoxylated novolac resin (0 to 20 percent by weight) and an uncured bisphenol A-epichlorohydrin epoxy resin (100 to 80 percent by weight).

2. Description of the Prior Art

During the past few years, a market for metal-plated plastic parts has grown rapidly as manufacturers have begun to appreciate the functional appearance of such parts when plated with bright, metallic finishes, and to take advantage of economies in cost and weight afforded by substituting molded plastic parts for metal. Furthermore, such plated finishes are not as susceptible to pitting and corrosion because there is no galvanic reaction between a plastic substrate and a plated metal.

Because plastic materials do not conduct electricity, it is common practice to provide a conductive layer or coating, such as copper, by electroless deposition so that an additional thickness of metals, particularly copper, nickel and chromium, can be electrolytically plated onto the electroless copper layer. Electroless deposition refers to an electrochemical deposition of a metal coating on a conductive, nonconductive, or semiconductive substrate in the absence of an external electrical source. While there are several methods of applying this metallic coating by a combined use of electroless and electrolytic procedures, it was not until quite recently that processes were developed which can provide even minimal adhesion of the conductive coating to the plastic. This is because overall adhesion is governed by the bond strength between the plastic substrate and the electroless copper layer. Even with these improved processes, reasonable adhesion can be obtained with only a very few plastics, and then only when great care is taken in all of the steps for the preparation and plating of the plastic substrate.

Two plastics extensively employed and upon which electroless deposition is conducted, especially in the printed circuit industry are (1) a cured epoxy (a cured diglycidyl ether of bisphenol A epoxy) resulting from curing an uncured condensation reaction product of epichlorohydrin and bisphenol A and (2) a cured epoxy resulting fron curing a mixture comprising the uncured bisphenol A-epichlorohydrin condensation product (cured diglycidyl ether of bisphenol A epoxy) and an epoxylated novolac resin. The uncured condensation reaction product or epoxy resin has a general structure

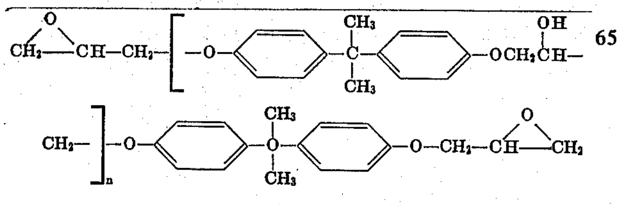

where $n$ is the number of repeated units in the resin chain. The varying types of these epoxy resins are described in terms of their melting point, epoxide equivalent and equivalent weight. The epoxide equivalent is defined as the number of grams of resin containing one gram equivalent of epoxide. The epoxide equivalent is determinative of the number of repeated units in the epoxy resin chain. The equivalent weight is defined as the number of grams of resin required to esterify completely a one gram mole of monobasic acid such as, for example, 60 grams of acetic acid.

The uncured epoxylated novolac has a general structure

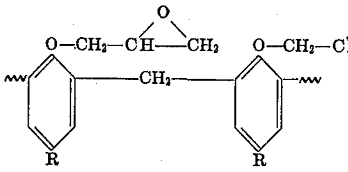

where R = H, O, alifatic group. The uncured epoxylated novolac resins are described in terms of weight per epoxide (W.P.E.).

One of the valuable properties of epoxy resins is their ability to transform readily from a liquid or thermoplastic state to tough, hard thermoset solids, i.e., transform from a linear structure to a network crosslinked in three dimensions. This hardening is accomplished by the addition of a chemically active reagent known as a curing agent. Some curing agents promote curing by catalytic action, others participate directly in the curing reaction and are absorbed into the resin chain.

The surface of a cured or crosslike epoxy article is hydrophobic and is therefore not wet by liquids having a high surface tension. Since electroless depositions usually employ aqueous sensitizing and activating solutions having metal ions therein, the surface will not be wet thereby. Since the sensitizing and activating solutions will not wet the surface, the catalytic species are not absorbed onto the surface and subsequent deposition of the metal ions cannot proceed.

In the present state of the art, various methods are available for rendering the surface of a polymer or a plastic material hydrophilic. One method in common practice in plating plastic materials entails mechanical roughening of the surface of the plastic. Initially, this surface roughening is accomplished by some form of mechanical deglazing, such as scrubbing with an abrasive slurry, wet tumbling, dry rolling or abrasive (sand) blasting. However, this prior art method gives an adhesion of up to 3 lbs./in. for a copper pattern on a cured diglycidyl ether of bisphenol A epoxy (a cured bisphenol A-epichlorohydrin). This adhesion is unsatisfactory for cured printed circuit boards made from a diglycidyl ether of bisphenol A epoxy and having a copper pattern thereon. It has been empirically established that a minimum peel rate strength of about 5 lbs./in. at a 90° peel and a peel rate of 2 in./min. is required to prevent a metal coating from blistering or peeling from a plastic surface during variations in temperature and to allow for various processing steps usually employed in generating the copper pattern. The adhesion requirements for printed circuit boards comprising the cured bisphenol A-epichlorohydrin epoxy (cured diglycidyl ether of bisphenol A epoxy) or the cured product resulting from curing a composition comprising the uncured bisphenol A-epichlorohydrin resin and the uncured epoxylated novolac resin is therefore at least 5 lbs./in. at a 90° peel and a peel rate of 2 in./min. (for a copper thickness of 1.4 mil).

In addition, this mechanical deglazing process is costly in that many parts have to be finished by hand and, in the case of relatively small parts, or parts with complex contours, it is very difficult to abrade the surface uniformly by conventional means. Another disadvantage to mechanical etching is that it is hard to control and many problems are encountered when the surface abrasion is carried too far. Of greatest disadvantage, however, is in forming printed circuits, utilizing a photoimaging process, such as the photoselective metal deposition process revealed in DeAngelo et al., Ser. No. 719,976, filed Apr. 9, 1968, now U.S. Pat. No. 3,562,005, and assigned to the assignee hereof. The photoimaging process inherently requires a high pattern resolution. This resolution is limited by the topography of the surface on which the pattern is generated. When mechanical deglazing is employed, e.g., by sand blasting, the resolution of the pattern suffers because of the mechanically roughened surface.

In more recent years, chemical deglazing or etching techniques were developed for various plastics using strong acidic solutions. U. S. Pat. No. 3,437,507 reveals a chromic acid treatment of plastics, such as an acrylonitrile-butadiene-styrene (A-B-S) and an amine catalyzed or cured bisphenol A-epichlorohydrin epoxy, to improve the adherence of an electroless deposit to the surface thereof. The A-B-S is a polystyrene copolymer system rich in one component (styrene) an having other components (acrylonitrile, rubber) which form different phases. The epoxy, on the other hand, is a single phase system. Again, as indicated above, a minimum adhesion value of 5 lbs./in. has to be met for cured bisphenol A-epichlorohydrin printed circuit boards as well as cured bisphenol A-epichlorohydrin-/epoxylated novolac boards. It has been found that a cured bisphenol A-epichlorohydrin epoxy treated in a manner revealed in U. S. Pat. No. 3,437,507, i.e., with chromic acid, gives adhesion values of about 3 lbs./in. for metallic patterns deposited thereon.

Another method, generally employed for plastics, such as A-B-S, comprises treating the plastic with an organic solvent thereof. U. S. Pat. No. 3,425,946 reveals such a method with A-B-S plastic. However, what solvents are effective depend on the plastic employed and is therefore empirical in nature. Organic solvent pretreatment alone has been found to ineffectively raise the adherence of metallic patterns to cured epoxies such as the cured epoxies of bisphenol A-epichlorohydrin. It has been found that a cured bisphenol A-epichlorohydrin epoxy treated in this fashion exhibits an adhesion of about 3 lbs./in., whereas as stated above, 5 lbs./in. is the minimum amount desired for printed circuit boards.

A solvent-etch technique has been employed to improve the adherence of deposited metals to A-B-S surfaces. U. S. Pat. No. 3,445,350; U. S. Pat. No. 3,479,160; and U. S. Pat. No. 3,142,581 reveal such a method. However, as explained above, A-B-S is a copolymer system, rich in one component, therefore, two different phases are present in the A-B-S. The employed solvent thereof and etchant thereof attack different phases to give micropores or cavities. The micropores and cavities provide mechanical anchorage for an electroless metal layer or coating destined to be deosited on the surface of the A-B-S. The cured bisphenol A-epichlorohydrin epoxy resin and the cured composition of combined bisphenol A-epichlorohydrin and epoxylated novolac on the other hand, are polymers having a single phase. Therefore, one phase can't be solvent treated and/or etched in preference to another phase to give micropores since there is only one phase. A solvent-etch system which works s for A-B-S could not therefore be deducibly said to work for an epoxy system comprising bisphenol A-epichlorohydrin, either alone or combined with epoxylated novolac.

A method of treating a cured epoxy surface which gives improved adherence with respect to selected deposited species thereon, especially in aqueous form, is therefore needed. Also needed is a method of depositing a metal deposit on a cured epoxy surface whereby the metal deposit has a peel strength of at least 5 lbs./in.

SUMMARY OF THE INVENTION

The present invention is directed to a method of improving adhesive properties of a surface comprising a cured epoxy and more particularly, to improving adherence of a selected species to a surface of a cured epoxy resulting from curing an uncured epoxy composition comprising an uncured epoxylated novolac resin (0 to 20 percent by weight) and an uncured bisphenol A-epichlorohydrin epoxy resin (100 to 80 percent by weight).

The method includes first exposing the cured epoxy surface to a suitable swellant of the cured epoxy. By a "cured epoxy" is meant, a product resulting from curing a composition comprising 0 to 20 weight percent of the uncured epoxylated novolac resin and from 100 to 80 weight percent of the uncured bisphenol A-epichlorohydrin resin (diglycidyl ether of bisphenol A epoxy). A suitable swellant is a solvent which (1) does not appreciably dissolve the cured epoxy (within a 24-hour period), (2) wets the epoxy surface, i.e., has a surface tension of up to 40 dynes/cm$^2$, and (3) has an average molecular weight of up to 150. Some typical suitable swellants include dimethylformamide, 1-methyl-2-pyrrolidinone, a mixture comprising 1-methyl-2-pyrrolidinone and an organic component selected from the group comprising of (a) ethylene glycol, (b) 4-hydroxy-4-methyl-2-pentanone, and (c) formic acid, and a mixture comprising dimethylformamide and an organic component selected from the group comprising (a) ethylene glycol, (b) 4-hydroxy-4-methyl-2-pentanone, (c) formic acid, (d) 1,1,1-trichloroethane, (e) a mixture of methyl ethyl ketone and 1,1,2 trichloro-1,2,2-trifluoroethane, and (f) a mixture of acetone and 1,1,2-trichloro-1,2,2-trifluoroethane.

The cured surface is exposed to the swellant for a period of time sufficient to swell the epoxy surface. The swelled epoxy surface is then exposed to an etchant for the cured epoxy, comprising $Cr^{+6}$ ions, e.g., $Cr_2O_7^{=}$, $CrO_3$, for a sufficient period of time to etch the swelled surface without unduly weakening or otherwise adversely affecting the physical characteristics of the epoxy.

The resultant etched surface is now in a condition of improved adherence for any species, e.g., printing ink, aqueous solutions, paints, coatings, metal deposits, etc., which may be deposited thereupon. For even greater improvement with respect to adhesive characteristics, the resultant etched surface may be further treated so as to remove essentially all traces of the etchant and/or etchant-epoxy material reaction product from the surface destined to be deposited upon. Where the species to be deposited upon the etched surface is one which is impenetrable with respect to the swellant employed, e.g., a metal deposit, the etched surface is even further treated. Such further treatment comprises heating or baking the surface, or the body thereof, at some point beyond the etching step whereby essentially all residual swellant is removed or driven off.

DESCRIPTION OF THE DRAWINGS

The present invention will be more readily understood by reference to the following drawing taken in conjunction with the detailed description, wherein.

DETAILED DESCRIPTION

The present invention is described primarily in terms of improving adherence of a copper deposit, deposited from an electroless plating bath, upon a cured epoxy. However, it will be understood that such description is exemplary only and is for purposes of exposition and not for purposes of limitation. It will be readily appreciated that the inventive concept described is equally applicable to improve adhesion between the cured epoxy and other conventional species which may be utilized in cementing, printing and metallizing the epoxy. Again, it is, of course, to be understood that by a "cured epoxy" is meant the product resulting from curing an epoxy composition comprising from 0 to 20 weight percent of uncured epoxylated novolac resin and from 100 to 80 weight percent of uncured bisphenol A-epichlorohydrin epoxy resin (diglycidyl ether of bisphenol A epoxy).

Figure 1:
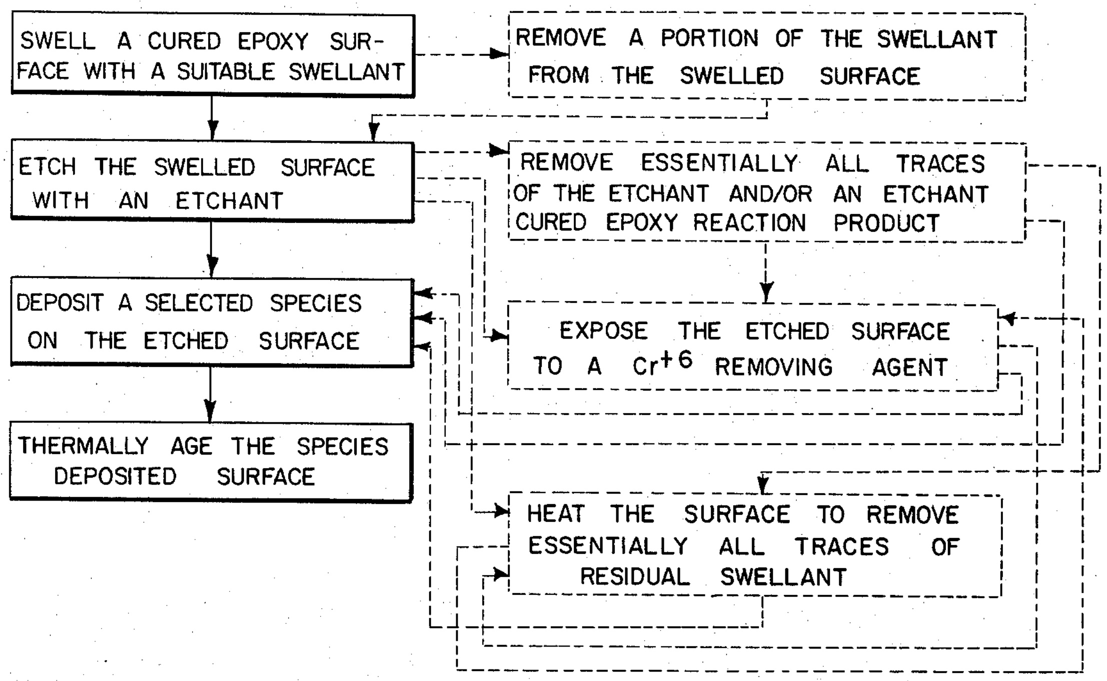
FIG. 1 is a general flow chart of the novel process of the invention.

With reference to the flow chart of FIG. 1, a substrate comprising a cured epoxy is selected upon which a suitable species, aqueous or non-aqueous, is destined to be deposited on a surface thereof. A suitable species may be any material, organic or inorganic, which is amenable of deposition upon the surface of the cured epoxy. Some typical suitable materials are water and/or organic solvent-based paints, lacquers or inks, inorganic salts, adhesives, metals, plastics, etc. The cured epoxy typically comprises a product resulting from curing an uncured diglycidyl ether of bisphenol A, i.e., an uncured bisphenol A-epichlorohydrin resin, with a curing agent or from curing an uncured diglycidyl ether of bisphenol A, i.e., an uncured bisphenol A-epichlorohydrin resin, combined with an epoxylated novolac resin with a curing agent, typically, the epoxylated resin being present in an amount ranging up to 20 weight percent of the combined resins. The uncured bisphenol A-epichlorohydrin (condensation reaction product between bisphenol A and epichlorohydrin) has a general formula

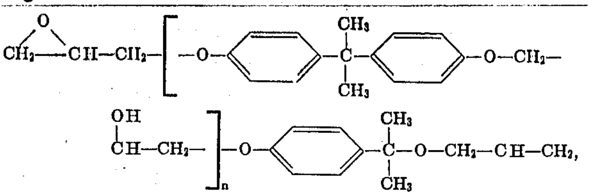

where $n$ is the number of repeated units in the resin chain. The uncured bisphenol A-epichlorohydrin resins are described in terms of their melting point, epoxide equivalent and equivalent weight. The epoxide equivalent is defined as the number of grams of resin containing one gram equivalent of epoxide. The equivalent weight is defined as the number of grams of resin required to esterify completely one gram/mole of monobasic acid, such as for example, 60 grams of acetic acid. The uncured epoxylated novolac resin has a general structure

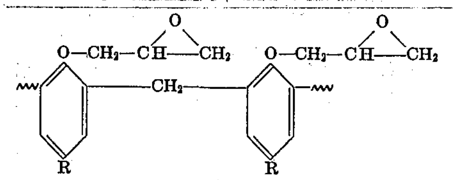

where R = H, O, or aliphatic group. The uncured epoxylated novolac resins are described in terms of weight per epoxide group (W.P.E.).

Some typical, suitable uncured bisphenol A-epichlorohydrin epoxy resins of interest are those having an epoxide equivalent ranging from about 140 to about 4,000. Some typical examples of these epoxies are those commercially available and designated as Epon ® epoxies. Some Epon ® epoxies are (1) Epon ® 1001, which is a trademark product of Shell Chemical Company and which is an uncured epoxy having an epoxide equivalent of 450 to 525, an equivalent weight of 1,300 and a melting point ranging from 64° to 76° C; (2) Epon ® 1007 which is a trademark product of Shell Chemical Company and which is an uncured epoxy having an epoxide equivalent of 1,550 to 2,000, an equivalent weight of 190 and a melting point ranging from 127° to 133° C; (3) Epon ® 1009 which is a trademark product of Shell Chemical Company and which is an uncured epoxy having an epoxide equivalent of 2,400 to 4,000, an equivalent weight of 200 and a melting point ranging from 145° to 115° C; (4) Epon ® 1004 which is a trademark product of Shell Chemical Company and which is an uncured epoxy having an epoxide equivalent of 870 to 1,025, an equivalent weight of 175 and a melting point of 95° to 105° C; (5) Epon ® 562 which is a trademark product of Shell Chemical Company and which is an uncured epoxy (liquid) having an epoxide equivalent of 140 to 165 and an average molecular weight of 300; (6) Epon ® 815 which is a trademark product of Shell Chemical Company and which is an uncured epoxy (liquid) having an epoxide equivalent of 175 to 210 and an average molecular weight of 340 to 400; (7) Epon ® 820 which is a trademark product of Shell Chemical Company and which is an uncured epoxy (liquid) having an epoxide equivalent of 175 to 210 and an average molecular weight of 350 to 400; (8) Epon ® 828 which is a trademark product of Shell Chemical Company and which is an uncured epoxy (liquid) having an epoxide equivalent of 175 to 210 and an average molecular weight of 350 to 400; (9) Epon ® 834 which is a trademark product of Shell Chemical Company and which is an uncured epoxy (liquid) having an epoxide equivalent of 225 to 290 and an average molecular weight of 450; (10) Epon ® 864 which is a trademark product of Shell Chemical Company and which has an epoxide equivalent of 300 to 375 and an average molecular weight of 700; and (11) Epon ® 1031 which is a trademark product of Shell Chemical Company and which is an uncured epoxy having an epoxide equivalent of 200 to 400.

Some other typical suitable uncured bisphenol A-epichlorohydrin epoxies are brominated products of the epoxies previously described. These uncured, brominated epoxies result from the same type condensation reaction as occurs between bisphenol A and epichlorohydrin except that tetrabromo-bisphenol A

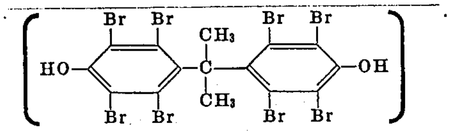

is employed. The uncured brominated condensation reaction product or epoxy resin has a general structure

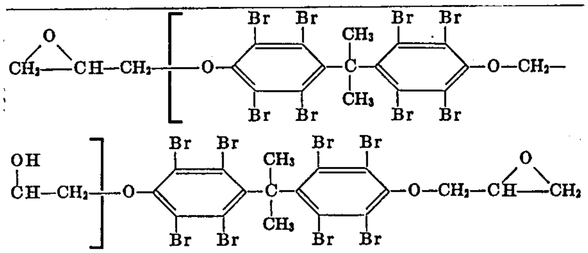

where *n* is the number of repeated units in the resin chain. A typical brominated epoxy is URX68-® which is a trademark product of Shell Chemical Company and which is an uncured brominated epoxy having an epoxide equivalent of 475 to 495, and a bromine content of 18-20 percent by weight.

Some typical suitable uncured epoxylated novolacs include:

1. Epon ® 152 which is a trademark product of Shell Chemical Company and which is an uncured epoxylated novolac having, a. an idealized structure of,

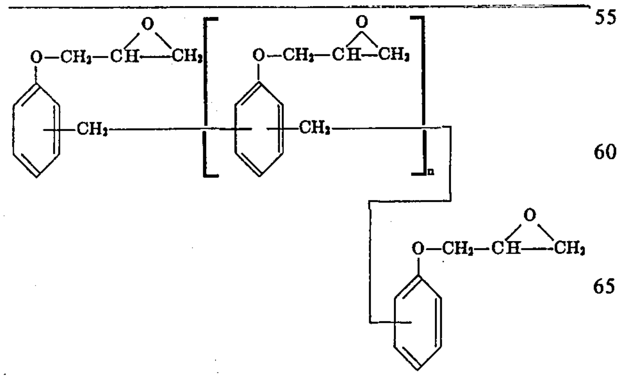

where *n* is an integer greater than 0;

b. a functionality of 2.0; and c. a weight per epoxide (W.P.E.) of 172 to 179 wherein W.P.E. is grams of the epoxylated novolac resin per gram equivalent of epoxide; and 2. Epon ® 154 which is a trademark product of Shell Chemical Company and which is an uncured epoxylated novolac having, (a) an idealized structure,

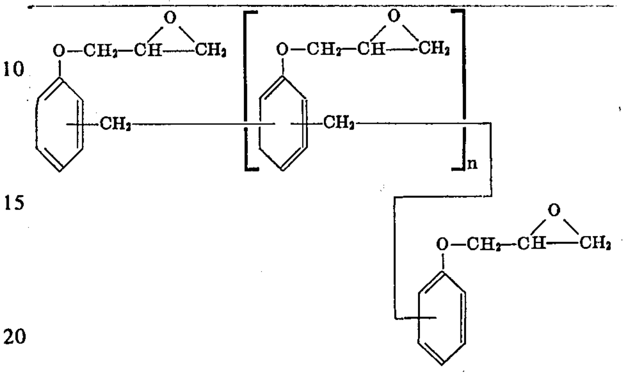

where *n* is a number greater than 1.5;

b. a functionability of 3.5; and c. a weight per epoxide of 176 to 181.

The uncured epoxy composition (comprising from 0 to 20 weight percent uncured epoxylated novolac resin and 100 to 80 weight percent of the uncured bisphenol A-epichlorohydrin epoxy) is first combined with a suitable curing agent, e.g., dicyandiamide, to form a mixture. Suitable curing agents are those well known in the art and are revealed in part and discussed in Epoxy Resins – Their Applications and Technology, H. Lee and K. Neville, McGraw Hill Book Company, Inc. (1957). The mixture of uncured epoxy and curing agent is then heated under conditions of time and temperature whereby a fully cured epoxy (bisphenol A-epichlorohydrin/epoxylated novolac, bisphenol A-epichlorohydrin) results. The curing conditions are well known in the art or are readily ascertainable experimentally. Generally, the amount of a particular type of curing agent, and the time-temperature parameters for curing an epoxy are given in part in Epoxy Resins – Their Applications and Technology previously referred to.

A full cure of the uncured epoxy composition, is attained by using from about 16 to about 20 weight percent (of the total mixture) of the dicyandiamide curing agent, contained in a suitable solvent carrier medium, e.g., dimethylformamide (when 100 weight percent of the uncured bisphenol A-epichlorohydrin is present in the epoxy composition), to about 4 to 5 weight percent (of the total mixture) of the curing agent (when the epoxylated novolac is present in the epoxy composition). By a full cure, one means that the resultant cured epoxy has been optimized to the extent possible with respect to electrical properties, mechanical properties and chemical resistance, i.e., with respect to criteria which are well known in the art or are easily ascertainable experimentally.

It is, of course, to be understood that the time and temperature curing parameters are interdependent and that variations in the temperature will produce variations in the other parameter whereby optimum results will be attained. In this regard, the various curing parameters and their interdependency are well known in the art, and their interaction between one another is also well known or can be easily ascertained experimentally by one skilled in the art.

The substrate surface comprising the cured epoxy, which is a reaction product of the uncured epoxy composition (100–80 weight percent bisphenol A-epichlorohydrin, 0–20 weight percent epoxylated novolac) and the curing agent, e.g., dicyandiamide, is exposed to a suitable swelling agent or penetrant for a period of time sufficient to swell regions of the cured epoxy surface. Swelling is defined as penetrating the epoxy in depth, by the swelling agent, without true dissolution thereof, and opening up or expanding in a spatial sense, the crosslinking network of the cured epoxy. A suitable swelling agent or penetrant is any material which (1) is capable of swelling the cured epoxy, (2) is chemically unreactive with the cured epoxy, (3) is not a solvent for the epoxy, i.e., does not dissolve the epoxy to any discernible extent (within a 24-hour period) and (4) is at least moderately miscible in water. Generally, a suitable swelling agent is any liquid having a surface tension of up to 40 dynes/cm$^2$, a solubility parameter close to that of the epoxy system chosen and molecular weight of up to 150. A sufficient period of time is interdependent upon the swelling agent or penetrant employed, and the temperature at which the cured epoxy is exposed to the penetrant. These are all factors which are well known to one skilled in the art or are easily ascertainable experimentally.

Suitable swelling agents or penetrants for cured epoxies resulting from a curing reaction between the uncured epoxy composition, comprising from 0 to 20 weight percent of the uncured epoxylated novolac and from 100 to 80 weight percent of the uncured bisphenol A-epichlorohydrin epoxies (having epoxide equivalents ranging from about 140 to about 4,000), and the curing agent, e.g., dicyandiamide, include (a) dimethylformamide, (b) 1-methyl-2-pyrrolidinone, and (c) a mixture of dimethylformamide and/or 1-methyl-2-pyrrolidinone combined with at least one of the following organic components comprising (1) ethylene glycol, (2) 4-hydroxy-4-methyl-2-pentanone, (3) formic acid, (4) 1,1,1 trichloroethane, (5) a mixture of methyl ethyl ketone and 1,1,2 trichloro-1,2,2 trifluoroethane and (6) a mixture of acetone and 1,1,2 trichloro-1,2,2 trifluoroethane.

It is to be noted and stressed that the dimethylformamide and 1-methyl-2-pyrrolidinone alone, i.e., uncombined, are effective swelling agents, however, either agent when combined with ethylene glycol and/or 4-hydroxy-4-methyl-2-pentanone and/or formic acid and/or 1,1,1 trichloroethane, and/or the mixture comprising methyl ethyl ketone and 1,1,2 trichloro-1,2,2 trifluoroethane and/or the mixture comprising acetone and 1,1,2 trichloro-1,2,2 trifluoroethane, forms a mixture which is even more effective. The reason for this greater effectiveness has been hypothesized to be attributed to a greater penetration or better flow into the cured epoxy by the swelling agent, i.e., the resultant mixture. Therefore the total amount of the swelling mixture absorbed into the cured epoxy is less, resulting in an equal or better swelling or spatial expansion. A preferred concentration of the organic components, i.e., the ethylene glycol, 4-hydroxy-4-methyl-2-pentanone, formic acid, etc., ranges from 10 to 60 volume percent of the total swelling mixture comprising dimethylformamide and/or 1-methyl-2-pyrrolidinone.

A preferred swelling exposure time to the swelling agents ranges from 1 to 5 minutes at 25° C whereby the cured epoxy is sufficiently swelled. A swelling time below 1 minute may lead to insufficient swelling of the cured epoxy surface and thereby ultimately lead to an insufficiency with respect to an etching to which the cured epoxy surface is to be subjected and hence poor adhesive properties thereof. A swelling time above 5 minutes may lead to a swelling excess, i.e., the cured epoxy is swelled or spatially expanded, with respect to its crosslinking networks to an intolerable degree. Since the amount of swelling is directly related to the degree and quality of the etch to which the epoxy is to be subjected, an excess amount of swelling leads to a much too vigorous subsequent etch and hence poor adhesive properties of the epoxy due to physical weakening thereof. It is to be noted that where dimethylformamide alone is employed, with a cured epoxy comprising essentially only the bisphenol A-epichlorohydrin epoxy without the epoxylated novolac, the swelling time may range up to 20 minutes at 25° C. However, where a resultant peel strength of at least 8 lbs./in. is desired a swelling time of 1 to 5 minutes is required. It is, of course, understood that the exposure time to a particular solvent is interdependent on temperature and the time periods given above for a temperature of 25° C is exemplary only and is not limiting. The time-temperature parameters are easily ascertainable by one skilled in the art.

Referring to FIG. 1, the swelled, cured epoxy (bisphenol A-epichlorohydrin, bisphenol A-epichlorohydrin/epoxylated novolac) may next be subjected to an optional step of removing excess swelling agent or penetrant from the cured epoxy surface. The removal may be affected by either rinsing the swelled, cured epoxy with a solvent for the swelling agent or by air drying with or without circulating air. The excess penetrant removal step is desirable in order not to destroy the potency or life of an etchant to which the swelled epoxy is destined to be exposed. If the penetrant removal step is performed, too much penetrant cannot be removed from the swelled epoxy surface since, as stated above, the degree of swelling affects the etching to which the swelled epoxy is destined to be subjected. If too much penetrant is removed, the degree of swelling decreases and ultimately the effectiveness of the destined etching. Some typical suitable solvents for the swelling agents include water, 2-ethoxyethanol, 1,1,1-trichloroethane, isopropanol and 1,1,2 trichloro-1,2,2 trifluoroethane. Typically, the swelled epoxy can be air dried or rinsed at a temperature of 25° C, for a period of time ranging from 15 seconds to 1 minute. It has been found that rinsing or drying beyond 1 minute may adversely affect peel strength. However, it is to be stressed that this excess penetrant removal step, although it is preferred in order to maintain the life of the etchant, is not essential to the present invention.

After the cured epoxy (bisphenol A-epichlorohydrin, bisphenol A-epichlorohydrin/epoxylated novolac) has been exposed to the swelling agent and perhaps rinsed with a solvent to remove any excess of the swelling agent from the swelled epoxy surface, the swelled epoxy surface is exposed to a suitable etchant thereof, at a suitable temperature, for a period of time sufficient to etch swelled sites. An adequate etching is typically evidenced by a pitted or roughened surface having pores or pits of 1$\mu$ or less in diameter and 0.25 to 1.25$\mu$ in depth. A suitable etchant is an etchant which will (1) etch the swelled, cured epoxy areas without unduly weakening the physical characteristics of the cured epoxy and (2) preferentially etch the swelled sites or regions of the swelled, cured epoxy surface more rapidly than those regions which are not swelled or are in a less swelled condition.

Suitable etchants for the cured epoxy, comprising the product resulting from curing the uncured epoxy composition (comprising 0–20 weight percent uncured epoxylated novolac resin, remainder uncured bisphenol A-epichlorohydrin epoxy resin) with a curing agent, e.g., dicyandiamide, are aqueous etching solutions containing $Cr^{+6}$ ions therein, e.g., an aqueous $CrO_3$ solution, an aqueous solution comprising $H_2SO_4$, $H_3PO_4$ and $CrO_3$, etc. A preferred etchant for the cured epoxy is an aqueous solution of $H_2SO_4$ and $CrO_3$ which may have added thereto a suitable surfactant. The surfactant is added to insure uniform etching of the swelled, cured epoxy surface. A suitable surfactant is any material which can withstand attack by hot $CrO_3$. Such surfactants are well known in the art by one skilled therein or are easily ascertained experimentally by one skilled in the art. Some typical surfactants are perfluorinated sulfonates. The concentration of the surfactant ranges from .1 to .5 gm./liter of etchant.

For an etching exposure within a temperature range of 40° to 50° C, the etching solution comprises a preferred concentration of $H_2SO_4$ which ranges from 2.7 to 5.4 moles/liter of the etching solution. If the concentration of the $H_2SO_4$ is less than 2.7 molar, an inadequate peel strength is obtained with an electroless copper deposit on the cured epoxy surface. If the concentration of the $H_2SO_4$ is greater than 5.4 molar, the resultant etch of the etching solution is too vigorous and the cured epoxy is physically weakened, thereby causing the bond strength to go down and thus leading to an inadequate peel strength for the electroless copper deposit.

For etching the swelled, cured epoxy at a temperature ranging from 40° to 50° C, the etching solution comprises a $CrO_3$ concentration ranging from at least 60 grams/liter of etching solution to saturation of the etching solution at the particular temperature. A preferred concentration of the $CrO_3$ in the etching solution, which is used within the above temperature range, is 60 to 100 grams/liter of the etching solution.

It is to be pointed out that the manner in which the etchant solution is prepared affects the adhesive properties of the cured epoxy. It has been found that the adhesive properties of the epoxy are optimized by preparing the etchant solution so that the $H_2SO_4$ is first added to water whereafter the resultant solution is cooled to room temperature. The $CrO_3$ is then added and the resultant solution is then heated, typically to a temperature in the range of 70° to 80° C for about 20 to about 60 minutes. In this regard, it is to be understood that the time-temperature parameters for heating the combined $H_2SO_4$, $CrO_3$ and water are interdependent. This interdependency is one which is well known in the art or can be easily ascertained experimentally.

It has been hypothesized that the optimum adhesion results which are obtained, through the use of the etchant solution prepared in the above-described manner, are due to a formation of $Cr_2O_7^=$ ions when the $CrO_3$ is heated in the presence of the $H_2SO_4$ and water. This hypothesis is strengthened by the fact that similar results can be achieved, without heating, by adding small catalytic amounts, typically 1 to 2 grams/liter of etchant, of dichromate, e.g., $Na_2Cr_2O_7$, $K_2Cr_2O_7$, to the etching solution comprising $H_2SO_4$ and $CrO_3$. It is, of course, understood that although the etchant solutions prepared by either heating the aqueous $H_2SO_4$ and $CrO_3$ solution or by adding $Cr_2O_7^=$ to the resultant mixture of $H_2SO_4$ and $CrO_3$ are preferred, improved adhesion properties of the cured epoxy are also obtained by other methods of preparing the etchant, although the degree of improvement may not be optimal.

The ambient temperature of the etchant solution dramatically affects the adhesive properties of the cured epoxy. It is, of course, understood that the temperature of the etching solution may vary over a broad spectrum, typically from 20° C to the boiling point of the etching solution. However, for many applications a peel strength of at least 8 lbs./in. is required and therefore a preferred temperature range which results in such a peel strength (with the swellants, swelling times, swelling temperatures, and etchant concentrations, given above) is in the range of 40° to 50° C. A sufficient period of time for etching the swelled, cured epoxy without weakening the swelled surface region thereof typically ranges from 1 to 10 minutes, at the preferred temperature (40° to 50° C) and the etchant component concentrations given above. Beyond 10 minutes the surface of the cured epoxy may degrade physically, e.g., become powdery, or otherwise be damaged, thereby lowering the adhesive properties or adhesive bond strength thereof. Below a 1 minute exposure, at a temperature of 40° to 50° C, the etching or roughening of the surface is insufficient and causes poor adhesion.

It is to be understood and stressed that the above concentration, temperature and time parameters are all interdependent and that variations in temperature will produce variations in the other parameters whereby optimum results will be attained. In this regard, the various parameters and their interdependency are well known in the art and their interaction between one another is also well known or can be easily ascertained experimentally by one skilled in the art.

Referring to the flow chart of FIG. 1, a second optional step may now be performed on the etched, cured epoxy. The optional step is a removal of essentially all traces of a deposit, residing on the etched epoxy surface, from the surface of the epoxy. The deposit comprises the etchant and/or an etchant-cured epoxy material reaction product which forms, e.g., oxidized or degraded epoxy material (bisphenol A-epichlorohydrin, bisphenol A-epichlorohydrin/epoxylated novolac). The removal may be best accomplished by rinsing the etched epoxy with water for approximately one minute. In this regard it is to be noted that the rinsing may extend beyond 1 minute since there is no adverse effect from long duration rinsing with water. It is also to be understood that the removal step may involve in whole or in part a mechanical removal, e.g., by a doctor blade removal of the etchant and/or etchant-cured epoxy reaction product which forms or remains on the surface of the etched, cured epoxy. It is again to be understood and stressed that although the removal step is a preferred step, especially where an electroless metal deposit is destined to be deposited on the cured epoxy surface, where traces of the etching solution and/or etchant-cured epoxy reaction product can be tolerated on the surface of the etched epoxy, this removal step may be eliminated.

A third optional step may now be performed on the etched, cured epoxy, either directly from the etching thereof or after the deposit removal step, if performed.

This third optional step comprises exposing the etched surface to a $Cr^{+6}$ removing agent whereby $Cr^{+6}$ ions which are present are either reduced to $Cr^{+4}$ ions by the agent or are dissolved in the agent. The $Cr^{+6}$ removing agent may comprise any suitable reducing agent for $Cr^{+6}$ ions, which are well known in the art to one skilled therein. A typical suitable reducing agent is $Na_2SO_3$, contained in a suitable carrier medium, e.g., water. Alternatively, the $Cr^{+6}$ removing agent may comprise any suitable basic agent which neutralizes acidic solutions and which are well known in the art to one skilled therein. A typical suitable basic agent is NaOH, contained in a suitable carrier medium, e.g., water.

Typically, the exposure to the reducing agent or the basic or neutralization agent ranges from 30 seconds to 2 minutes at a temperature ranging from 25° to 70° C. In this regard, it is to be understood that the time-temperature parameters above are illustrative only and that the time-temperature parameters are interdependent and may be varied to obtain optimum results. Again, it is to be pointed out that the interrelationship between time and temperature is well known in the art or can be easily ascertained by one skilled in the art. Also, it is again to be understood and stressed that although the reducing agent or neutralizing agent exposure step is a preferred step, especially where an electroless metal deposit is destined to be deposited on the etched, cured epoxy surface, where $Cr^{+6}$ ions can be tolerated on the surface or in the interior of the cured epoxy, this removal step may be eliminated.

Where a swellant impermeable species, e.g., a metal, is destined to be deposited on the etched surface, the etched epoxy surface has to be further treated to attain optimal effective bonding between the epoxy surface and the deposited species, e.g., an electroless metal deposit. Such treatment comprises heating or baking the epoxy surface, at some point subsequent to the etching thereof and prior to the deposition of the species, e.g., the metal deposit, thereon, whereby essentially all traces of residual swellant which may be present are removed or driven off. The heating of the epoxy surface, or the body having such surface, may be performed directly from the etching thereof or from either of the optional removal steps (the second and third optional steps) described above. Typically the heating or baking is performed at a temperature ranging from 100° to 180° C for a time period ranging from 10 minutes to 120 minutes. Again it is to be pointed out that the above time and temperature parameters are interdependent and that variations in temperature will produce variations in other parameters whereby optimum results will be attained. In this regard, the interrelationship between time and temperature is well known in the art or can be easily ascertained by one skilled therein. It is to be understood and stressed that although the heating or baking step is a necessary step where a swellant impermeable species, such as a metal deposit, is deposited on the surface of the epoxy, such a heating step may be omitted where a swellant or solvent, permeable species, e.g., an organic ink, adhesive, etc., is deposited on the epoxy surface.

A suitable species is then deposited on the etched, cured epoxy surface (bisphenol A-epichlorohydrin, bisphenol A-epichlorohydrin/epoxylated novolac), which may or may not have traces of the etchant and/or etchant-cured epoxy reaction product or $Cr^{+6}$ ions or residual swellant on the surface, or on the substrate or the body having such surface. A suitable species may be any of a multitude of materials well known in the art which can be deposited upon a cured epoxy surface, comprising a cured product resulting from curing the uncured epoxy composition (0–20 percent epoxylated novolac, remainder uncured bisphenol A-epichlorohydrin epoxy), and comprises in part conventional aqueous or organic based paints, lacquers, inks and adhesives, aqueous or non-aqueous solutions of inorganic salts, aqueous or non-aqueous electroless metal deposition solutions and the metal deposits resulting therefrom, metals, etc. The suitable species may be deposited or applied to the etched, cured epoxy surface by any standard means known in the art including dipping, brushing, spray coating, spin coating, vapor depositing, electroless depositing with or without electrodepositing, sputtering, etc.

Figure 2:
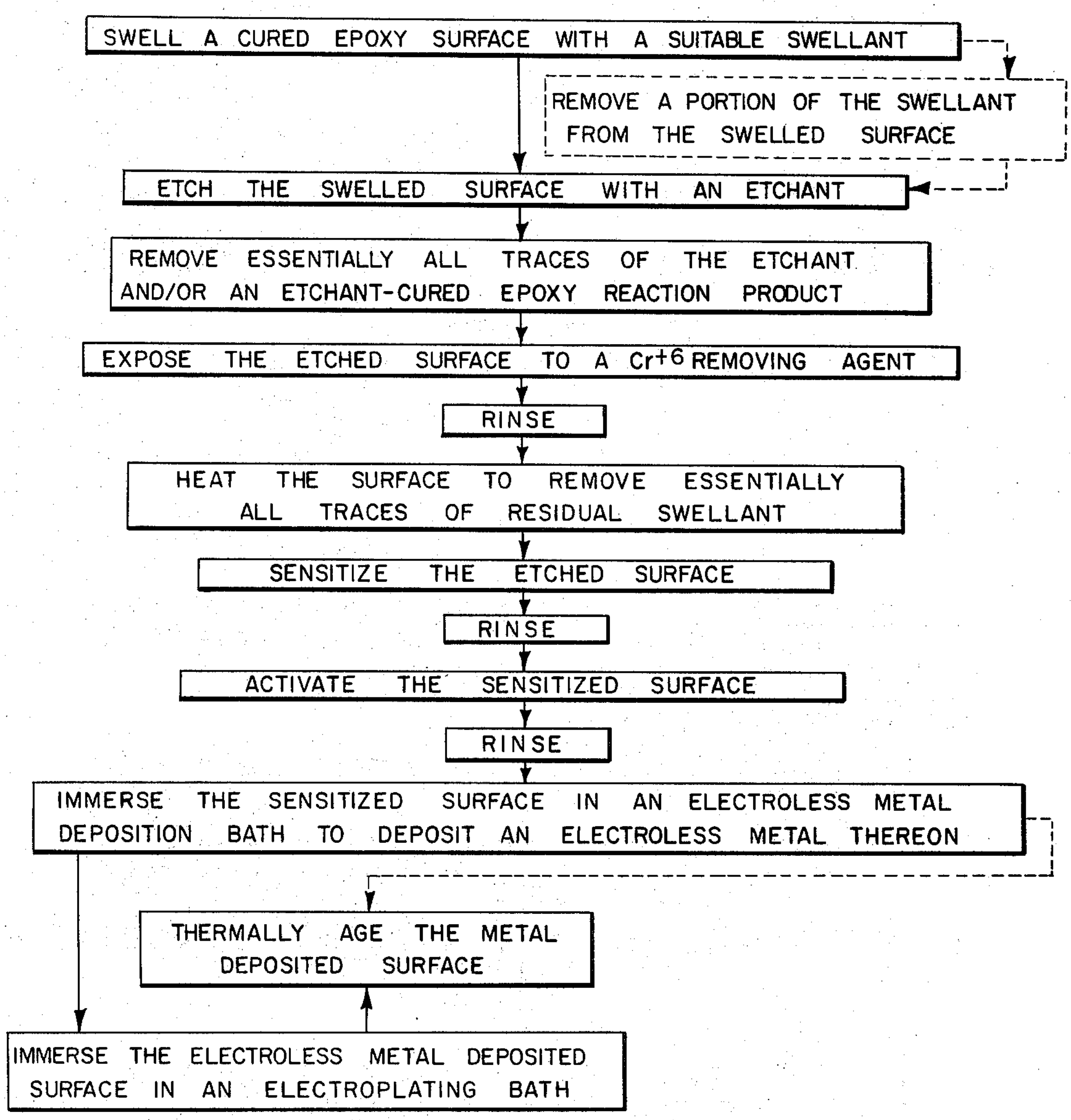
FIG. 2 is a flow chart of the process of the invention directed to an electroless metal deposition.

The selected species-deposited, cured epoxy surface is then thermally aged or post baked for a period of time sufficient to insure adequate adhesion of the selected species to the cured epoxy surface, e.g., an adequate adhesion typically being represented by a metal deposit (electroless and electro) evidencing a peel strength of at least 5 lbs./in. The thermal aging typically may be at a temperature of 25° C for at least 24 hours, preferably at 110° to 160° C for 10 to 60 minutes. Again, it is to be understood and stressed that the above temperature and time parameters are all interdependent and that variations in temperature will produce variations in the other parameters whereby optimum results will be attained. In this regard, the time-temperature adhesion parameters are well known in the art and their interaction between one another is also well known or can be easily ascertained experimentally by one skilled in the art.

Where the selected species is an electrolessly deposited metal, a standard electroless technique may be employed. A typical standard method of electroless deposition is outlined in the flow sheet of FIG. 2. It is, of course, understood that any conventional electroless metal deposition technique may be employed and the outline in FIG. 2 is illustrative only and not restrictive. The swelled and subsequently etched, cured epoxy surface is thoroughly rinsed with water or any other suitable cleaning agent to remove essentially all traces of the etchant and/or etchant-cured epoxy material reaction product. Proper rinsing is essential in order to remove essentially all traces of the etchant from the etched, cured epoxy surface as well as any etchant-cured epoxy reaction product which may form, so as not to contaminate a sensitizing, an activating and an electroless plating solution to which the etched surface is destined to be subjected. Contamination, particularly of the plating bath, is undesirable because the stability of such plating baths is frequently adversely affected by such a condition.

After rinsing, the etched, cured epoxy is exposed to a suitable reducing agent or neutralizer to reduce or dissolve essentially all $Cr^{+6}$ ions present. The etched, cured epoxy is then rinsed again thoroughly with water which as discussed above is essential to prevent contamination.

As discussed above, where a swellant impervious species such as an electroless metal deposit is destined to be deposited on the etched, cured epoxy surface, the epoxy surface has to be heat treated or baked prior to the deposition of the electroless metal. Such heat treatment or baking can be carried out at any stage between the etching of the epoxy substrate and electrolessly depositing the metal. Preferably, however, the heating or baking of the etched, epoxy surface is carried out prior to a sensitization thereof, typically after the $Cr^{+6}$ reduction or dissolving and prior to such sensitization. Sensitization consists of depositing or absorbing on the etched surface a sensitizing species, e.g., $Sn^{+2}$ ions, which is readily oxidized. Typically, the heating or baking is performed at a temperature ranging from 100° to 180° C for a time period ranging from 10 minutes to 120 minutes. A preferred time period ranges from 10 minutes to 60 minutes at the above temperature range. Again, as discussed above, the time-temperature parameters are interdependent and optimization of results desired with respect thereto are within the ability of one skilled in the art.

The etched epoxy surface is then sensitized. Conventionally, the cleaned and etched surface is dipped into a standard sensitizing solution, e.g., aqueous stannous chloride with a supporting medium such as HCl, ethanol, ethanol and caustic, or ethanol and hydroquinone. It is to be understood that the sensitizing solutions and the conditions and procedures of sensitizing are well known in the art and will not be elaborated herein. Such sensitizers and procedures may be found, in part, in Metallic Coating of Plastics, William Goldie, Electrochemical Publications 1968.

After sensitizing the etched, cured epoxy surface, the sensitized surface is rinsed, then activated. It is to be noted that it is important that the sensitized surface be rinsed thoroughly in a cleaning medium, e.g., deionized water, after sensitizing. If such is not done, there is a possibility that excess sensitizer on the roughened surface will cause reduction of an activating species, e.g., $Pd^{+2}$, to which the sensitized surface is destined to be exposed, in non-adherent form on the etched surface. Activation relates to providing a deposit of a catalytic metal, e.g., Pd, over the etched surface of the cured epoxy polymer, in sufficient quantities to successfully catalyze a plating reaction once the etched surface is introduced into an electroless plating bath. The sensitized surface is exposed to a solution containing the activating species, e.g., a noble metal ion, wherein the sensitizing species is readily oxidized and the noble metal ion, e.g., $Pd^{+2}$, is reduced to the metal, e.g., Pd, which in turn is deposited on the etched, cured epoxy surface. The deposited activating metal, e.g., Pd, acts as a catalyst for localized further plating. Again, it is to be understood that the various activating metal ions and their solutions, the conditions and procedures of activation are well known in the art and will not be elaborated herein. Such activators and procedures may be found, in part, in Metallic Coating of Plastics, previously referred to.

After the activating step, the activated, epoxy surface is rinsed with deionized water and then immersed in a standard electroless plating bath comprising a reducing agent, e.g., and a metal ion, e.g., $Cu^{+2}$, destined to be catalytically reduced by the reducing agent in the presence of the catalytic metal species, e.g., Pd. The metal ion, e.g., $Cu^{+2}$, is catalytically reduced by the reducing agent, e.g., in the presence of the catalytic metal, e.g., Pd, and is electrolessly deposited on the polymeric surface. Again it is to be pointed out that the electroless baths, the electroless plating conditions and procedures are well known in the art and will not be elaborated herein. Reference is again made to Metallic Coating of Plastics, previously referred to, for some typical examples of electroless baths and plating parameters. It is to be noted that in some cases, it is possible to combine the sensitizing and activating steps into one step. The electroless metal-deposited, cured epoxy surface is then thermally aged, e.g., at 110° to 160° C for 10 to 60 minutes, whereby an adherent electroless metal deposit is attained. It is to be noted that the electroless metal deposit may be subjected to a conventional electroplating treatment whereby it is built up. In such a situation, it is, of course, understood that there may be an additional thermal aging or post bake or just one thermal aging, after the final electroplating treatment.

It is, of course, to be understood that the above-described electroless and/or electroplating sequence may be utilized for fabricating printed circuit boards having a metal pattern on a substrate surface, comprising the cured epoxy product resulting from curing the uncured epoxy composition (0 to 20 weight percent of an uncured epoxylated novolac resin and from 100 to 80 weight percent of an uncured bisphenol A-epichlorohydrin resin).

Figure 3:
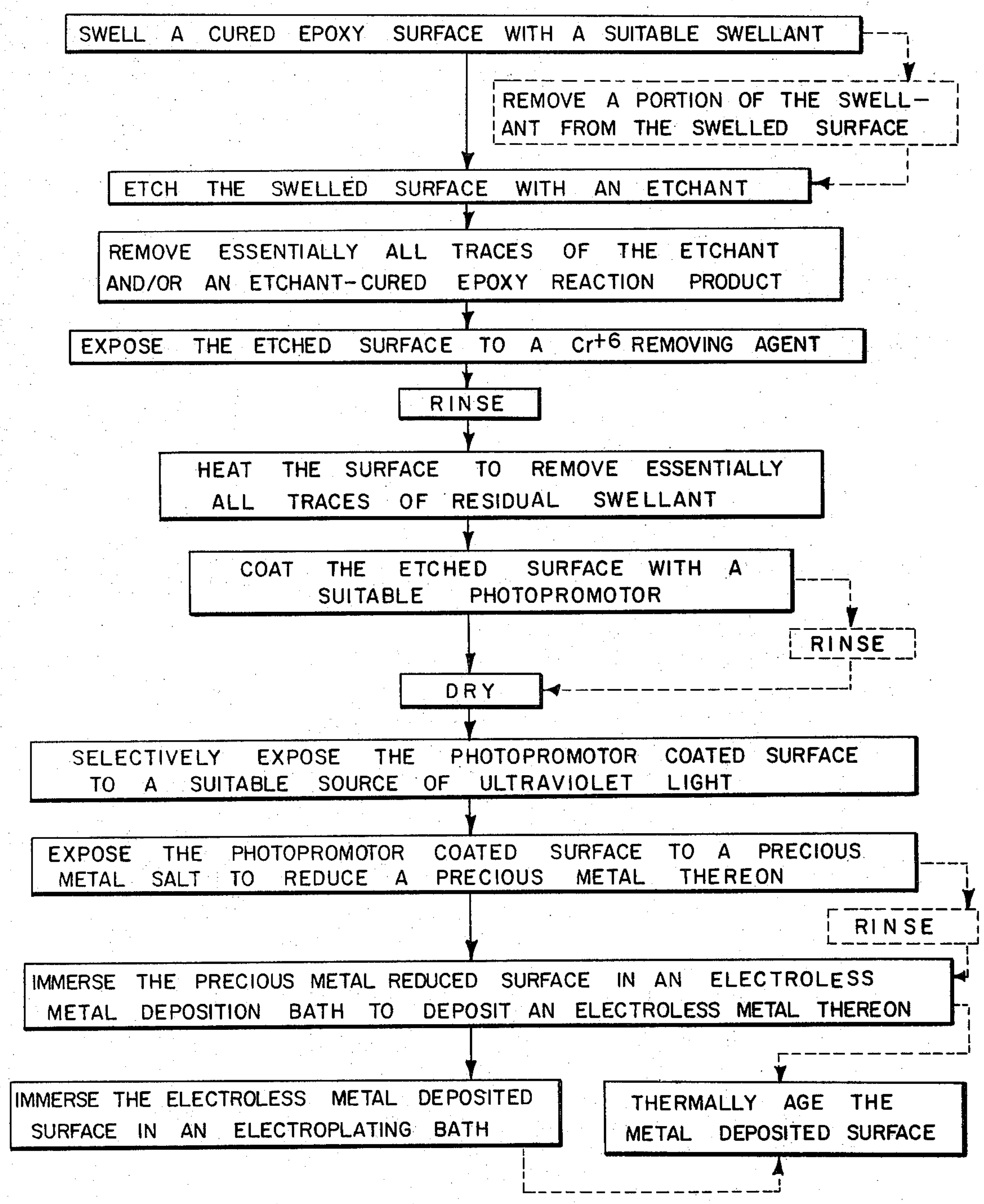
FIG. 3 is a flow chart of the process of the invention directed to a photosensitive electroless metal deposition.

A preferred method of electrolessly depositing a metal on the resultant etched epoxy surface is the method revealed in DeAngelo et. al., Ser. No. 719,976, filed Apr. 9, 1968, and now U.S. Pat. No. 3,562,005, assigned to the assignee hereof and incorporated by reference hereinto. Referring to FIG. 3, the method entails applying a photopromoter solution to the surface resulting from the swelling and etching of the cured epoxy utilizing procedures revealed in M. A. DeAngelo et al. It is to be noted that the etched epoxy surface is treated, prior to the photopromoter coating, so as to remove a portion of the deposit, representing essentially all traces of the etching solution and/or etchant-cured epoxy material reaction product, and essentially all traces of $Cr^{+6}$ ions (as discussed above), from the surface followed by a thorough rinsing thereof. The rinsed surface is then heat treated or baked, as discussed above, whereby essentially all traces of residual swellant which may be present are removed from the etched epoxy surface and/or the interior thereof. As discussed previously, this heating or baking step improves the adhesion of metal deposits to the epoxy surface. Also, as discussed previously, this heating or baking step may be carried out at any stage between the etching of the epoxy, with the etchants discussed above, and the deposition of the metal thereon. However, preferably, the heating or baking step is performed subsequent to the etching step and/or the deposit removal and $Cr^{+6}$ removal steps, discussed above, and prior to applying the photopromoter thereto. Typically such preferred heating is conducted subsequent to the $Cr^{+6}$ removal step and prior to the application of photopromoter. The time-temperature parameters are as given above, namely 100° to 180° C for a time period ranging from 10 to 120 minutes with a preferred range being 10 to 60 minutes at that temperature range.

A photopromoter is defined as a substance which, upon being exposed to appropriate radiation, either (a) dissipates chemical energy already possessed thereby or (b) stores chemical energy not previously possessed thereby. When the substance possesses or has stored chemical energy, it is capable of promoting, other than as a catalyst, a chemical reaction whereby it, the photopromoter, undergoes a chemical change in performing its function (unlike a catalyst). The resultant photopromoter-covered, cured epoxy surface may then be rinsed with deionized water (depending on the type of photopromoter employed) and is then dried. The photopromoter-coated surface is then selectively exposed to a source of ultraviolet radiation, through a suitable mask, to form at least one region which is capable of reducing a precious metal from a precious metal salt, e.g., $PdCl_2$. The region so capable is exposed to the precious metal salt, e.g., $PdCl_2$, whereby the precious metal salt is reduced to the precious metal, e.g., Pd, which in turn is deposited thereon.

The precious metal-deposited region is then exposed to a suitable electroless metal plating bath, e.g., copper, wherein the metal, e.g., copper, is plated on the region forming an adherent metal deposit on the previously swelled and etched, cured epoxy surface. The electroless metal-deposited cured epoxy surface is then thermally aged or post baked, e.g., typically at 110° to 160° C for 10 to 60 minutes, whereby an adherent electroless metal deposit is attained. It is to be noted that the electroless metal deposit may be subjected to a conventional electroplating treatment whereby the electroless metal deposit is built up. In such a situation, it is again to be understood that there may be an additional thermal aging or just one thermal aging, after the electroplating treatment.

It is again to be understood that the above-described electroless and/or electroplating sequence may be utilized for fabricating printed circuit boards having a metal pattern on a substrate surface, comprising the cured epoxy product resulting from curing the uncured epoxy composition (0 to 20 weight percent of an uncured epoxylated novolac resin and from 100 to 80 weight percent of an uncured bisphenol A-epichlorohydrin resin).

A suitable photopromoter solution may be either a positive type or a negative type as discussed in M. A. DeAngelo et al. A suitable mask, either positive or negative depending on whether the photopromoter is positive or negative, is one as discussed in DeAngelo et al., and typically comprises a quartz body having a radiation opaque pattern thereon. The ultraviolet radiation source is a source of short wavelength radiation (less than 3,000A., and typically about 1,800A. to about 2,900A.).

It is again to be understood that the above-described electroless and/or electroplating sequence may be utilized for fabricating printed circuit boards having a metal pattern on a substrate surface, comprising the cured epoxy product resulting from curing the uncured epoxy composition (0 to 20 weight percent of an uncured epoxylated novolac resin and from 100 to 80 weight percent of an uncured bisphenol A-epichlorohydrin resin).

EXAMPLE I

Figure 4:
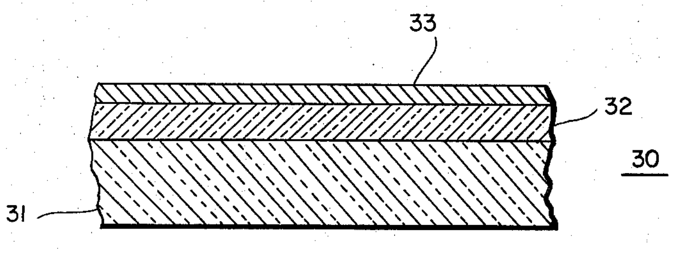
FIG. 4 is a cross-sectional view of a cured epoxy coated substrate plated with an electroless metal deposit utilizing the process of the invention.

A. Referring to FIG. 4, a commercially obtained laminate 30, comprising a woven glass fibre fabric 31 coated with a cured epoxy layer 32, was subjected to a swelling treatment. The cured epoxy comprised a cured product resulting from curing an epoxy composition, comprising 80 weight percent of a commercially obtained uncured bisphenol A-epichlorohydrin epoxy resin having an epoxide equivalent ranging from 400 to 2,000, and 20 weight percent of a commercially obtained epoxylated novolac resin having a weight per epoxide in the range of 176 to 181, and 4 weight percent dicyandiamide as the curing agent. A final laminate 30 and cure of the epoxy layer 32 was obtained using a conventional dry lay-up technique and heating the combined bisphenol A-epichlorohydrin and the epoxylated novolac at a temperature of 345° F for 1 hour at a pressure of 250 lbs./in.$^2$.

The cured epoxy-coated substrate 30, was then subjected to a swelling treatment whereby the cured epoxy layer 32 was swelled. The cured epoxy-coated substrate 30 was immersed in a solvent bath comprising a dimethylformamide swelling agent. The swelling bath was maintained at 25° C and the time of immersion was 5 minutes. The swelled, cured epoxy-coated substrate 30 was then rinsed twice with a solvent for the swelling agent comprising an azeotropic mixture of 1,1,2-trichloro-1,2,2 trifluoroethane and acetone, for a 30-second time interval each time.

The swelled epoxy-coated substrate 30 was then immersed in an aqueous etchant solution comprising 5.4 moles $H_2SO_4$ and 100 grams $CrO_3$/liter of solution which had been heated in the range of 70° to 80° C for about 20 minutes. The etching solution was prepared as described above, namely by first adding $H_2SO_4$ to water followed by adding $CrO_3$ to the resultant acid solution. The etching solution was maintained at a temperature of 40° C and the substrate 30 was held therein for 3 minutes whereby the swelled, cured epoxy coating or film 32 was etched. After etching, the epoxy-coated substrate 30 was immersed in water for 2 minutes at 25° C. The substrate 30 was then immersed in a reducing solution comprising 25 grams/liter of $Na_2SO_3$ maintained at a temperature of 25° C for 30 seconds. The etched, epoxy-coated substrate 30 was then rinsed in deionized water for one minute to prevent contamination of an aqueous sensitizing solution, comprising one weight percent $SnCl_4$ and 0.5 weight percent $SnCl_2 \cdot 2H_2O$, into which the etched substrate 30 was immersed at a temperature of 25° C for one minute. The substrate 30 was rinsed with deionized water for 1 minute. The sensitized substrate 30 was immersed in a 0.01 molar aqueous $PdCl_2$ solution for 30 seconds forming reduced metal, i.e., Pd, on the surfaces of the etched substrate 30, whereafter the substrate 30 was immersed in an electroless copper plating bath, commercially obtained, to form an electroless copper deposit 33 on the substrate 30. The electroless copper deposit 33 was then subjected to a conventional electroplating treatment whereby the copper deposit 33 was built up to a thickness of 1.5 mils. The substrate 30 was then subjected to a thermal aging or post bake at a temperature of 120° C for 1 hour.

The copper-deposited substrate 30 was then subjected to a commercial bond strength testing apparatus whereby the copper deposit 33 had an adhesion of 11 lbs./in. (90° peel at a peel rate of 2 in./min.).

B. The procedure of Example I-A was repeated except that the etching was carried out at a temperature of 45° C for 5 minutes. The adhesion value was 19 lbs./in.

C. The procedure of Example I-A was repeated except that etching was carried out at a temperature of 50° C for 5 minutes. The adhesion value was in excess of 16 lbs./in.

D. The substrate of Example I-B was repeated except that the swelling was carried out with a 1-methyl-2-pyrrolidinone swelling agent at a temperature of 25° C for 3 minutes. The adhesion value was 13 lbs./in.

E. The procedure of Example I-B was repeated except that the swelling was carried out with a swelling agent mixture comprising 90 volume percent 1-methyl-2-pyrrolidinone and 10 volume percent 4-hydroxy-4-methyl-2-pentanone. The swelling was carried out at 25° C for 3 minutes. The solvent rinsing was with 1,1,2 trichloro-1,2,2 trifluoroethane for 30 seconds followed by a one minute drain. The adhesion value was 17 lbs./in.

F. The procedure of Example I-B was repeated except that the swelling was carried out with a mixture comprising 50 volume percent dimethylformamide and 50 volume percent ethylene glycol. The swelling was carried out at 25° C for 3 minutes at a temperature of 25° C. The swellant rinsing step was carried out with a mixture comprising 80 volume percent 1,1,2-trichloro-1,2,2 trifluoroethane and 20 volume percent methyl ethyl ketone at a temperature of 25° C for 30 seconds. The adhesion value was 9 lbs./in.

G. The procedure of Example I-B was repeated except that the swelling was carried out with a mixture comprising 80 volume percent dimethylformamide and 20 volume percent 1,1,1 trichloroethane. The swelling was carried out at 25° C for 3 minutes. There was no swellant removal rinsing step. The adhesion value was 15 lbs./in.

H. The procedure of Example I-B was repeated except that the swelling was carried out with a mixture comprising 68 volume percent 1-methyl-2-pyrrolidinone and 32 volume percent formic acid. The swelling was carried out at 25° C for 3 minutes. The swellant removal rinse step was carried out with isopropyl alcohol at a temperature of 25° C for a time period of 30 seconds. The adhesion value was 10 lbs./in.

I. The procedure of Example I-H was repeated except that the swelling was carried out with a mixture comprising 90 volume percent 1-methyl-2-pyrrolidinone and 10 volume percent formic acid. The adhesion value was 10 lbs./in.

J. The procedure of Example I-B was repeated except that the swelling was carried out with a mixture comprising 80 volume percent dimethylformamide and 20 volume percent 4-hydroxy-4-methyl-2-pentanone. The adhesion value was 12 lbs./in.

K. The procedure of Example I-J was repeated except that the swelling was carried out with a mixture comprising 90 volume percent dimethylformamide and 10 volume percent 4-hydroxy-4-methyl-2-pentanone. The adhesion value was 12 lbs./in.

EXAMPLE II

A. The procedure of Example I-A was repeated except that the epoxy layer 32 comprised the cured product resulting from curing a composition, comprising 85 weight percent of an uncured brominated bisphenol A-epichlorohydrin epoxy resin having an epoxide equivalent ranging from 300 to 400 and 10 weight percent of epoxylated novolac resin having a weight per epoxide in the range of 176 to 181, with 5 percent dicyandiamide. A final cure was obtained by a dry lay-up lamination whereby the uncured mixture was heated at a temperature of 325° F for 90 minutes at a pressure of 25 lbs./in. The adhesion value was 10 lbs./in.

B. The procedure of Example II-A was repeated except that the etching was carried out at a temperature of 45° C for 5 minutes. The adhesion value was 18 lbs./in.

C. The procedure of Example II-A was repeated except that the etching was carried out at a temperature of 50° C for 5 minutes. The adhesion value was 15 lbs./in.

D. The substrate of Example II-A was used and the procedure of Example I-D was repeated. The adhesion was 12 lbs./in.

E. The substrate of Example II-A was employed and the procedure of Example I-E was repeated. The adhesion value was 16 lbs./in.

F. The substrate of Example II-A was employed and the procedure of Example I-F was repeated. The adhesion value was 10 lbs./in.

G. The substrate of Example II-A was employed and the procedure of Example I-G was repeated. The adhesion value was 16 lbs./in.

H. The substrate of Example II-A was employed and the procedure of Example I-H was repeated. The adhesion value was 11 lbs./in.

I. The substrate of Example II-A was employed and the procedure of Example I-I was repeated. The adhesion value was 11 lbs./in.

J. The substrate of Example II-A was employed and the procedure of Example I-J was repeated. The adhesion value was 13 lbs./in.

K. The substrate of Example II-A was employed and the procedure of Example I-K was repeated. The adhesion value was 13 lbs./in.

EXAMPLE III

A. The procedure of Example I-A was repeated except that the epoxy layer comprised the cured product resulting from curing an epoxy composition, comprising 100 percent by weight of a commercially obtained uncured brominated bisphenol A-epichlorohydrin epoxy having an epoxide equivalent of 475 to 495 and a bromine content of 18 to 20 percent by weight, with about 16 weight precent of the total reaction mixture of dicyandiamide as the curing agent. A final laminate 30 and cure of the epoxy layer 32 was by a dry lay-up lamination whereby the uncured composition was heated at a temperature of 325° F for 1 hour at a pressure of 25 lbs./in. The swelling was carried out with a swelling agent mixture comprising 90 volume percent 1-methyl-2-pyrrolidinone and 10 volume percent ethylene glycol. The swelling was carried out at 25° C for 3 minutes. The etching was carried out at 40° C for 5 minutes. The adhesion value was 8 lbs./in.

B. The procedure of Example III-A was repeated except that the swelling agent comprised a mixture of 50 volume percent dimethylformamide and 50 volume percent of (1) methyl ethyl ketone (25 volume percent) and (2) 1,1,2 trichloro-1,2,2, trifluoroethane (25 volume percent). The adhesion value was 11 lbs./in.

C. The procedure of example III-A was repeated except that the swelling agent comprised a mixture of 50 volume percent dimethylformamide and 50 volume percent of an azeotropic mixture of acetone and 1,1,2 trichloro-1,1,2 trifluoroethane. The adhesion value was 11 lbs./in.

EXAMPLE IV

A. Referring to FIG. 4, a commercially obtained laminate substrate 30, comprising a woven glass fibre fabric 31 coated with a cured epoxy layer 32, was subjected to a swelling treatment. The cured epoxy layer 32 comprised the cured product resulting from curing an epoxy composition, comprising 100 percent by weight of a commercially obtained uncured brominated bisphenol A-epichlorohydrin epoxy having an epoxide equivalent of 475 to 495 and a bromine content of 18 to 20 percent by weight. Dicyandiamide was employed as the curing agent (present in an amount of 16 weight percent of the combined epoxy composition and curing agent). A final laminate 30 and cure of the epoxy layer 32 was by a dry lay-up lamination whereby the uncured composition was heated at a temperature of 325° F for 1 hour at a pressure of 25 lbs./in.

The cured epoxy substrate 30 was then subjected to a swelling treatment whereby the cured epoxy layer 32 was swelled. The cured epoxy substrate 30 was immersed in a solvent bath comprising a mixture of 47 volume percent dimethylformamide and 53 volume percent 1,1,1 trichloroethane. The swelling bath was maintained at 25° C. The time of immersion was 1 minute.

The swelled epoxy-coated substrate 30 was then immersed in an aqueous etchant solution comprising 5.4 moles $H_2SO_4$ and 100 grams $CrO_3$/liter of solution which had been heated in the range of 70° to 80° C for about 20 minutes. The etching solution was maintained at a temperature of about 46° C and the substrate 30 was held therein for 5 minutes whereby the swelled, cured epoxy coating or film 32 was etched. After etching, the epoxy-coated substrate 30 was immersed in water for 2 minutes at 25° C. The substrate 30 was then immersed in a reducing solution comprising 25 grams/liter of $Na_2SO_3$ maintained at a temperature of 25° C for 30 seconds. The etched, epoxy-coated substrate 30 was then rinsed in deionized water for 1 minute and then baked or heated at a temperature of about 155° C to 158° C for 30 minutes.

The baked or heated substrate 30 was immersed in an aqueous sensitizing solution maintained at 25° C, comprising 1 weight percent $SnCl_4$ and 0.5 weight percent $SnCl_2 \cdot 2H_2O$, for 1 minute. The sensitized substrate 30 was immersed in a 0.01 molar aqueous $PdCl_2$ solution for 30 seconds forming reduced metal, i.e., Pd, on the surface of the etched substrate 30, whereafter the substrate 30 was immersed in an electroless copper plating bath, commecially obtained, to form an electroless deposit 33 on the substrate 30. The electroless copper deposit 33 was then subjected to a conventional electroplating treatment whereby the copper deposit 33 was built up to a thickness of 1.5 mils. The substrate 30 was then subjected to a thermal aging or post bake at a temperature of 158° C for 1 hour.

The copper-deposited substrate was subjected to a commercial bond strength testing apparatus whereby the copper deposit 33 had an adhesion of about 17 lbs./in. (90° peel at a peel rate of 2 in./min.).

The copper-deposited substrate 30 was then immersed for 20 seconds in a solder pot comprising a molten mixture of Sn, Pb, commercially obtained, maintained at a temperature of about 260° C. Blistering of the copper deposit was not observed.

B. For comparison purposes, the procedure of Example IV-A was repeated except that the baking step prior to sensitizing the substrate 30 was carried out for 5 minutes. Blistering of the copper deposit 33 resulted from immersion in the solder pot.

C. The procedure of Example IV-A was repeated except that the baking step prior to sensitizing the substrate 30 was carried out for 10 minutes. No blistering of the copper deposit 33 resulted from immersion in the solder pot.

D. The procedure of eXample IV-A was repeated except that the baking step prior to sensitizing the substrate 30 was carried out for 20 minutes. No blistering of the copper deposit 33 resulted from immersion in the solder pot.

It is to be understood that the abovedescribed embodiments are simply illustrative of the principles of the invention. Various other modifications and changes may be devised by those skilled in the art which will embody the principles of the invention and fall within the spirit and scope thereof.

What is claimed is:

1. A method of improving adhesive properties of a cured epoxy surface comprising a cured product resulting from curing a composition comprising from 0 to 20 weight percent of an uncured epoxylated novolac resin and a remainder of an uncured bisphenol A-epichlorohydrin epoxy resin, which comprises:

a. exposing the cured epoxy surface to a suitable swellant selected from the group of swellants consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane, and a mixture comprising acetone and 1,1,2 trichloro-1,2,2 trifluoroethane and (3) mixtures thereof, to swell the cured epoxy surface; and b. exposing said swelled surface at a temperature ranging from 40° to 50° C to an etchant for the cured epoxy surface comprising $H_2SO_4$ in a concentration ranging from 2.7 to 5.4 moles/liter of etchant and $Cr^{+6}$ ions, added as $CrO_3$ in a concentration ranging from a minimum of at least 60 grams/liter of etchant solution to saturation of said etchant solution at a particular temperature, to etch said swelled surface.

2. A method of improving adherence of a selected species to a cured epoxy surface resulting from curing a composition comprising from 0 to 20 weight percent of an uncured epoxylated novolac resin and a remainder of an uncured bisphenol A-epichlorohydrin epoxy resin, which comprises:

a. exposing the cured epoxy surface to a suitable swellant selected from the group of swellants consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane and a mixture comprising acetone and 1,1,2 trichloro-1,2,2 trifluoroethane and (3) mixtures thereof to swell the cured epoxy surface;

b. exposing said swelled surface at a temperature ranging from 40° to 50° C to an etchant for the cured epoxy surface comprising $H_2SO_4$ in a concentration ranging from 2.7 to 5.4 moles/liter of etchant and $Cr^{+6}$ ions, added as $CrO_3$ in a concentration ranging from a minimum of at least 60 grams/liter of etchant solution to saturation of said etchant solution at a particular temperature, to etch said swelled surface; and c. depositing the selected species on said etched surface.

3. The method as defined in claim 2 which further comprises:

prior to step (c) heating said etched surface to remove residual swellant.

4. The method as defined in claim 2 which further comprises thermally aging said species-deposited surface.

5. In an improved method of improving adherence of an electroless metal deposit to a surface of a substrate comprising a cured epoxy product resulting from curing a composition comprising from 0 to 20 weight percent of an uncured epoxylated novolac and a remainder of an uncured bisphenol A-epichlorohydrin epoxy resin, which comprises the steps of:

a. sensitizing the surface to form a sensitized surface;

b. activating the sensitized surface to form an activated surface; and c. exposing the activated surface to a suitable electroless bath to deposit the electroless metal thereon, the improvement comprising:

a'. prior to step (a) above, exposing the cured epoxy surface to a suitable swellant selected from the group of swellants consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane and a mixture comprising acetone and 1,1,2 trichloro-1,2,2 trifluoroethane and (3) mixtures thereof, to swell the cured epoxy surface; and b'. prior to step (a) above, exposing said swelled surface at a temperature ranging from 40° to 50° C to an etchant for the cured epoxy surface comprising $H_2SO_4$ in a concentration ranging from 2.7 to 5.4 moles/liter of etchant and $Cr^{+6}$, added as $CrO_3$ in a concentration ranging from a minimum of at least 60 grams/liter of etchant solution to saturation of said etchant solution at a particular temperature, to etch said swelled surface.

6. The method as defined in claim 5 which further comprises heating said etched surface prior to step (a) to remove residual swellant.

7. The method as defined in claim 5 which further comprises thermally aging said metal-deposited surface.

8. The method as defined in claim 5 which further comprises treating said etched surface with a suitable $Cr^{+6}$ removing agent to remove $Cr^{+6}$ therefrom.

9. In an improved method of producing an adherent metallic pattern on a surface of a substrate comprising a cured product resulting from curing an uncured epoxy composition comprising from 0 to 20 weight percent of an uncured epoxylated novolac resin and from 100 to 80 weight percent of an uncured bisphenol A-epichlorohydrin epoxy resin, which comprises the steps of:

a. coating the surface with a photopromoter;

b. producing a pattern capable of reducing a precious metal from a precious metal salt by selectively exposing a portion of the photopromoter-coated surface to a source of short wavelength ultraviolet light;

c. immersing the substrate in a precious metal salt solution to reduce on the pattern the precious metal; and then d. placing the precious metal pattern in an electroless plating bath which is catalyzed by the reduced precious metal to produce the metallic pattern, the improvement comprising:

a'. prior to step (a) above, exposing the cured epoxy surface to a suitable swelling agent selected from the group of swelling agents consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane and a mixture comprising acetone and 1,1,2 trichloro-1,2,2 trifluoroethane and (3) mixtures thereof, to swell the cured epoxy surface; and b'. prior to step (a) above, exposing said swelled surface at a temperature ranging from 40° to 50° C to an etchant for the cured epoxy surface comprising $H_2SO_4$ in a concentration ranging from 2.7 to 5.4 moles/liter of etchant and $Cr^{+6}$, added as $CrO_3$ in a concentration ranging from a minimum of at least 60 grams/liter of etchant solution to saturation of said etchant solution at a particular temperature, to etch said swelled surface.

10. The method as defined in claim 9 which further comprises baking said etched surface prior to step (a) to remove residual swelling agent therefrom.

11. The method as defined in claim 9 which further comprises thermally aging said metallic patterned surface.

12. The method as defined in claim 9 which further comprises removing a deposit residing on said etched surface, said deposit being one of the group consisting of said etchant, an etchant-epoxy reaction product and mixtures thereof.

13. The method as defined in claim 9 which further comprises treating said etched surface with a suitable $Cr^{+6}$ removing agent to remove $Cr^{+6}$ ions therefrom.

14. In an improved method of depositing a metal deposit, having a peel strength of at least 8 lbs./in., on a surface of a substrate comprising a cured epoxy product resulting from curing an uncured epoxy composition comprising from 0 to 20 weight percent of an uncured epoxylated novolac resin and from 100 to 80 weight percent of an uncured bisphenol A-epichlorohydrin resin, which comprises the steps of:

a. rendering the surface catalytic with respect to an electroless plating solution;

b. exposing the catalytic surface to a suitable electroless bath, catalyzed by the catalytic surface, to deposit the electroless metal thereon; and c. electroplating the electroless metal deposit to obtain a metal deposit having a desired thickness, the improvement comprising:

a[1]. prior to step (a) above, exposing the cured epoxy surface to a suitable swellant, selected from the group consisting of (1) a mixture comprising 1-methyl-2-pyrrolidinone and an organic component selected from the group consisting of ethylene glycol, 4-hydroxy-4-methyl-2-pentanone and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane, and a mixture comprising acetone and 1,1,2 trichloro-1,2,2 trifluoroethane, and (3) mixtures thereof, for a period of time ranging from 1 to 5 minutes at a temperature of 25° C, to swell the cured epoxy surface;

b[1]. prior to step (a) above, exposing said swelled surface to an etching solution, comprising $H_2SO_4$ in a concentration ranging from 2.7 to 5.4 moles/liter of solution and $Cr^{+6}$, added as $CrO_3$, in a concentration ranging from 60 to 100 grams/-liter of solution, at a temperature ranging from 40° to 50° C for a period of time ranging from 1 to 10 minutes, to etch said swelled surface; and c[1]. thermally aging the metal-deposited surface.

15. The method as defined in claim 14 which further comprises heating said etched surface prior to step (a).

16. The method as defined in claim 14 which further comprises treating said etched surface with a suitable $Cr^{+6}$ removing agent to remove $Cr^{+6}$ ions therefrom.

17. A method of improving adhesive properties of a cured epoxy surface comprising a cured product resulting from curing a composition comprising from 0 to 20 weight percent of an uncured epoxylated novolac resin and a remainder of an uncured bisphenol A-epichlorohydrin epoxy resin, which comprises:

a. exposing the cured epoxy surface to a suitable swellant selected from the group of swellants consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane, and a mixture comprising acetone and 1,1,2 trichloro-1,2,2 trifluoroethane and (3) mixtures thereof to swell the cured epoxy surface;

b. preparing an etching solution by a method comprising (1) adding $H_2SO_4$ to water, in an amount which gives a concentration ranging from 2.7 to 5.4 moles/liter of solution, to form a first acid solution, (2) adding $CrO_3$ to said first acid solution in an amount which gives a concentration ranging from a minimum of at least 60 grams/liter of etching solution to saturation of said etching solution at a particular temperature, to form a second acid solution, and (3) heating said second acid solution; and c. exposing said swelled surface to said etching solution at a temperature ranging from 40° to 50° C to etch said swelled surface.

18. The method as defined in claim 17 wherein:

in step (b) 60 to 100 grams of $CrO_3$/liter of etching solution was added, and in step (c) said exposure ranged from 1 to 10 minutes at a temperature ranging from 40° to 50° C.

19. A method of improving adherence of an electroless metal deposit to a surface of a substrate comprising a cured epoxy product resulting from curing a composition comprising from 0 to 20 weight percent of an uncured epoxylated novolac and a remainder of an uncured bisphenol A-epichlorohydrin epoxy resin, which comprises the steps of:

a. exposing the cured epoxy surface to a suitable swellant selected from the group of swellants consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from he group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane and a mixture comprising acetone and 1,1,2 trichloro-1,2,2 trifluoroethane and (3) mixtures thereof, to swell the cured epoxy surface;

b. exposing said swelled surface, at a temperature ranging from 40° to 50° C to an etchant for the cured epoxy surface comprising $H_2SO_4$ in a concentration ranging from 2.7 to 5.4 moles/liter of etchant and $Cr^{+6}$, added as $CrO_3$ in a concentration ranging from a minimum of at least 60 grams/liter of etchant solution to saturation of said etchant solution at a particular temperature, to etch said swelled surface;

c. heating said etched surface to remove residual swellant; and d. rendering said heated surface catalytic with respect to an electroless plating solution.

20. The method as defined in claim 19, wherein in step (c) said surface is heated to a temperature ranging from 100° to 180° C for a time period ranging from 10 minutes to 60 minutes.

21. The method as defined in claim 19 which further comprises exposing said catalytic surface to an electroless bath, catalyzed by said catalytic surface, to deposit the electroless metal thereon.

22. The method as defined in claim 19 which further comprises, prior to step (c), treating said etched surface with a suitable $Cr^{+6}$ removing agent to remove $Cr^{+6}$ therefrom.

23. The method as defined in claim 19 which further includes, prior to step (b), preparing said etchant by (1) adding $H_2SO_4$ to a water medium to form a first acid solution, (2) adding $CrO_3$ to said first acid solution to form a second acid solution and (3) heating said second acid solution.

24. The method as defined in claim 21 which further comprises thermally aging said metal-deposited surface.

25. A method of producing an adherent metallic pattern on a surface of a substrate comprising a cured product resulting from curing an uncured epoxy composition comprising from 0 to 20 weight percent of an uncured epoxylated novolac resin and from 100 to 80 weight percent of an uncured bisphenol A-epichlorohydrin epoxy resin, which comprises the steps of:

a. swelling the cured epoxy surface with a suitable swelling agent selected from the group of swelling agents consisting of (1) a mixture comprising 1-methyl-2-pyrrolidinone and an organic component selected from the group consisting of ethylene glycol, 4-hydroxy-4-methyl-2-pentanone, and formic acid, (2) a mixture comprising dimethylformamide and an organic component selected from the group consisting of ethylene glycol, 4-hydroxy-4-methyl-2-pentanone, formic acid, 1,1,1 trichloroethane, a mixture comprising methyl ethyl ketone and 1,1,2 trichloro-1,2,2 trifluoroethane and a mixture comprising acetone and 1,1,2 trichloro-1,2,2 trifluoroethane, and (3) mixtures thereof;

b. etching said swelled surface at a temperature ranging from 40° to 50° C with an etchant for the cured epoxy surface comprising $H_2SO_4$ in a concentration ranging from 2.7 to 5.4 moles/liter of etchant and $Cr^{+6}$, added as $CrO_3$ in a concentration ranging from a minimum of at least 60 grams/liter of etchant solution to saturation of said etchant solution at a particular temperature;

c. baking said etched surface to remove residual swellant; and d. rendering selected portions of said heated surface capable of catalyzing an electroless deposition, said selected portions corresponding to the metallic pattern.

26. The method as defined in claim 25 wherein in step (c) said surface is baked at a temperature ranging from 100° to 180° C for a time period ranging from 10 minutes to 60 minutes.

27. The method as defined in claim 25 which further comprises exposing said catalytic selected portions of said surface to an electroless bath, catalyzed by said catalytic selected portions, to deposit the electroless metal thereon.

28. The method as defined in claim 25 which further comprises, prior to step (c), removing a deposit residing on said etched surface, said deposit being one of the group consisting of said etchant, an etchant-epoxy reaction product and mixtures thereof.

29. The method as defined in claim 25 which further comprises treating said etched surface with a suitable $Cr^{+6}$ removing agent to remove $Cr^{+6}$ therefrom.

30. The method as defined in claim 25 which further includes, prior to step (b), preparing said etchant by (1) adding $H_2SO_4$ to a water medium to form a first acid solution, (2) adding $CrO_3$ to said first acid solution to form a second acid solution and (3) heating said second acid solution.

31. The method as defined in claim 27 which further comprises thermally aging said metal-deposited surface.

32. In an improved method of making a printed circuit board having a metal pattern on a substrate surface comprising a cured epoxy product resulting from curing an uncured epoxy composition comprising from 0 to 20 weight percent of an uncured epoxylated novolac resin and from 100 to 80 weight percent of an uncured bisphenol A-epichlorohydrin resin, which comprises the steps of:

a. sensitizing selected portions of the surface corresponding to the metal pattern;

b. activating the selected portions;

c. exposing the activated selected portions to an electroless bath, to deposit an electroless metal thereon, and d. electroplating the electroless metal deposit to obtain a metal deposit having a desired thickness, the improvement comprising:

$a^1$. prior to step (a) above, swelling the cured epoxy surface with a suitable swellant, selected from the group consisting of (1) a mixture comprising 1-methyl-2-pyrrolidinone and an organic component selected from the group consisting of ethylene glycol, 4-hydroxy-4-methyl-2-pentanone and formic acid, (2) a mixture comprising dimethylformamide and an organic component selected from the group consisting of ethylene glycol, 4-hydroxy-4-methyl-2-pentanone, formic acid, 1,1,1,1 trichloroethane, a mixture comprising methyl ethyl ketone and 1,1,2 trichloro-1,2,2 trifluoroethane, and a mixture comprising acetone and 1,1,2 trichloro-1,2,2 trifluoroethane, and (3) mixtures thereof;

$b^1$. prior to step (a) above, preparing an etching solution by a method comprising (1) adding $H_2SO_4$ to water in an amount which gives a concentration ranging from 2.7 to 5.4 moles/liter of solution to form a first acid solution, (2) adding $CrO_3$ to said first acid solution to form a second acid solution, said $CrO_3$ being added in an amount which gives a concentration thereof ranging from 60 to 100 grams/liter of said second acid solution and (3) heating said second acid solution to a temperature ranging from 70° to 80° C for a period of time ranging from 20 to 60 minutes;

$c^1$. immersing said swelled surface in said etching solution, maintained at a temperature ranging from 40° to 50° C, for a period of time ranging from 1 to 10 minutes to etch said swelled surface;

$d^1$. prior to step (a) above, heating said etched surface to remove residual swellant; and $e^1$. thermally aging the metal-deposited surface.

33. The method as defined in claim 32 wherein:

in step ($a^1$) said swelling is for a period of time ranging from 1 to 5 minutes at a temperature of 25° C.

34. In an improved method of making a printed circuit board having a metal circuit pattern on a substrate surface comprising a cured epoxy product resulting from curing an uncured epoxy composition comprising from 0 to 20 weight percent of an uncured epoxylated novolac resin and from 100 to 80 weight percent of an uncured bisphenol A-epichlorohydrin resin, which comprises the steps of:

a. coating the surface with a photopromoter;

b. producing a pattern, corresponding to the metal circuit pattern, capable of reducing a precious metal from a precious metal salt by selectively exposing selected portions of the photopromoter-coated surface to a source of short wavelength ultraviolet radiation;

c. immersing the surface in a precious metal salt solution to reduce on the pattern the precious metal;

d. placing the precious metal pattern in an eletroless plating bath, which is catalyzed by the reduced precious metal, to deposit electroless metal thereon; and e. electroplating the electroless metal deposit to obtain a metal deposit having a desired thickness, the improvement comprising:

$a^1$. prior to step (a) above, swelling the cured epoxy surface with a suitable swellant, selected from the group consisting of (1) a mixture comprising 1-methyl-2-pyrrolidinone and an organic component selected from the group consisting of ethylene glycol, 4-hydroxy-4-methyl-2-pentanone and formic acid, (2) a mixture comprising dimethylformamide and an organic component selected from the group consisting of ethylene gylcol, 4-hydroxy-4-methyl-2-pentanone, formic acid, 1,1,1 trichloroethane, a mixture comprising methyl ethyl ketone and 1,1,2 trichloro-1,2,2 trifluoroethane, and a mixture comprising acetone and 1,1,2 trichloro-1,2,2 trifluoroethane, and (3) mixtures thereof;

$b^1$. prior to step (a) above, preparing an etching solution by a method comprising (1) adding $H_2SO_4$ to water in an amount which gives a concentration ranging from 2.7 to 5.4 miles/liter of solution to form a first acid solution, (2) adding $CrO_3$ to said first acid solution to form a second acid solution, said $CrO_3$ being added in an amount which gives a concentration thereof ranging from 60 to 100 grams/liter of said second acid solution and (3) heating said second acid solution to a temperature ranging from 70° to 80° C for a period of time ranging from 20 to 60 minutes;

$c^1$. immersing said swelled surface in said etching solution, maintained at a temperature ranging from 40° to 50° C, for a period of time ranging from 1 to 10 minutes to etch said swelled surface;

$d^1$. prior to step (a) above, heating said etched surface to remove residual swellant; and $e^1$. thermally aging the metal-deposited surface.

35. The method as defined in claim 34 wherein: in step ($a^1$) said swelling is for a period of time ranging from 1 to 5 minutes at a temperature of 25°C.

* * * * *

L-566-PT
(6-69)

UNITED STATES PATENT OFFICE
CERTIFICATE OF CORRECTION

Patent No. 3,808,028 Dated April 30, 1974

Inventor(s) D. J. Lando

It is certified that error appears in the above-identified patent and that said Letters Patent are hereby corrected as shown below:

In the specification, column 1, line 57, "fron" should read --from--. Column 2, line 39, "crosslike" should read --crosslinked--; line 64, "minimum peel rate" should read --minimum peel--. Column 3, line 35, "an having" should read --and having--. Column 4, line 5, "deosited" should read --deposited--; line 12, "works s for" should read --works for--. Column 6, line 50, "115°C" should read --155°C--. Column 7, lines 22 to 28, the formula should read:

--

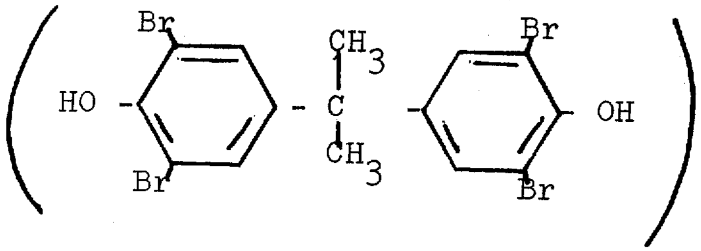

--

L-566-PT
(6-69)

UNITED STATES PATENT OFFICE
CERTIFICATE OF CORRECTION

Patent No. 3,808,028 Dated April 30, 1974

Inventor(s) D. J. Lando

It is certified that error appears in the above-identified patent and that said Letters Patent are hereby corrected as shown below:

Column 8, lines 31 and 32, "Epoxy Resins - Their Application and Technology" should read --Epoxy Resins - Their Application and Technology--; lines 43 and 44, "Epoxy Resins - Their Application and Technology" should read --Epoxy Resins - Their Application and Technology--. Column 15, line 27, "Metallic Coating of Plastics" should read --Metallic Coating of Plastics--; line 54, "Metallic Coating of Plastics" should read --Metallic Coating of Plastics--; line 59, "e.g., and" should read --e.g., $H\overset{\overset{O}{\|}}{C}-H$, and--; line 63, "e.g., in" should read --e.g., $H\overset{\overset{O}{\|}}{C}-H$, in--. Column 16, lines 1 and 2, "Metallic Coating of Plastics" should read --Metallic Coating of Plastics--. Column 19, line 62, "5 percent" should read --5 weight percent--. Column 20, line 40, "precent" should read --percent--; line 58, "example" should read --Example--. Column 21, line 42, "minute. The sensitized" should read --minute. The substrate 30 was rinsed with deionized water for one minute. The sensitized--. Column 22, line 6, "eXample" should read --Example--; line 11, "abovedescribed" should read --above-described--.

In the claims, column 26, claim 19, line 35, "he group" should read --the group--. Column 28, claim 32, line 19, "thereon," should read --thereon;--; line 33, "1,1,1,1 trichloroethane" should read --1,1,1 trichloroethane--.

Column 30, claim 34, line 8, "miles" should read --moles--.

Signed and sealed this 24th day of September 1974.

(SEAL)
Attest:

McCOY M. GIBSON JR.
Attesting Officer

C. MARSHALL DANN
Commissioner of Patents